No. 878,168. PATENTED FEB. 4, 1908.
L. W. WHIPPLE.
PLEASURE GIVING MACHINE.
APPLICATION FILED MAY 10, 1907.

3 SHEETS—SHEET 1.

Witnesses:
Clarence E. Lesuer
Grace Crowley.

Inventor:
Leon W. Whipple.

No. 878,168. PATENTED FEB. 4, 1908.
L. W. WHIPPLE.
PLEASURE GIVING MACHINE.
APPLICATION FILED MAY 10, 1907.
3 SHEETS—SHEET 3.
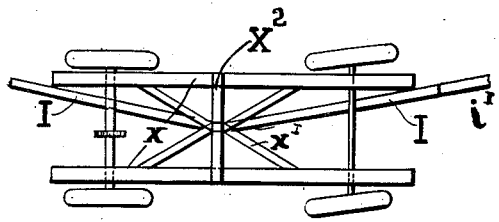
FIG. 4.
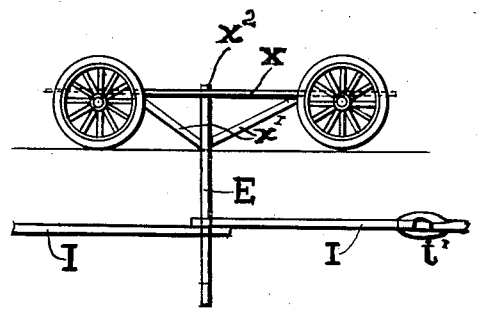
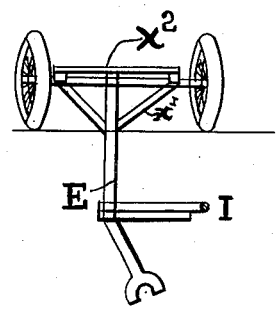
FIG. 5.
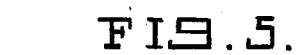
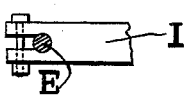
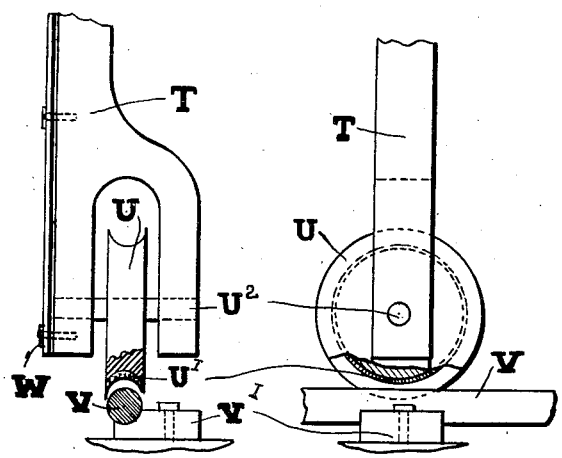
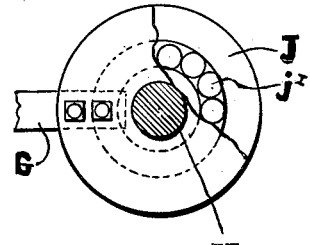
FIG. 7.
FIG. 6.
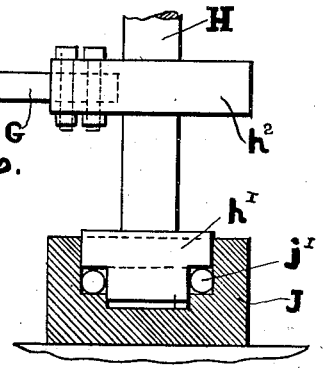
Witnesses:
Clarence C. Lesuer.
Grace Crowley.
Inventor:
Leon W. Whipple

UNITED STATES PATENT OFFICE.

LEON W. WHIPPLE, OF LOWELL, MASSACHUSETTS.

PLEASURE-GIVING MACHINE.

No. 878,168.  Specification of Letters Patent.  Patented Feb. 4, 1908.

Application filed May 10, 1907. Serial No. 373,006.

*To all whom it may concern:*

Be it known that I, LEON WELLINGTON WHIPPLE, a citizen of the United States, residing at Lowell, in the county of Middlesex and State of Massachusetts, have invented a new and useful Pleasure-Giving Machine, of which the following is a specification.

My invention relates to a pleasure-giving machine, consisting of a number of automobiles run in a continuous circle fastened one to the other, beneath the floor, on which they run. One or more of which to furnish the power or the power to be furnished from the outside. The floor to be left open to allow for a rod which is made fast to both axles of the automobile and extends to a circular track beneath, spanning the track in the shape of a fork, which does not touch said track, but may act as a guide to keep automobiles in their proper course. Said rod is also made fast to an arm or spoke at a point between the floor and the circular guide track and is made fast in a hub which has a shaft in its center extending through the first floor, through and above the second floor, there having a pulley from which a crossed belt or cable runs to another pulley with a shaft in its center extending back through the second floor with train of miter gears with varying ratio attached to concaved pulleys on which hangs the track to which the continuous scene is fastened, thus running scene in opposite direction to the traveling automobiles and bringing scene inside of automobile course and outside of all iron rods or bolts; also upright timbers used to hold up and brace inner section of floor made necessary by opening the floor beneath the automobiles, to allow for above mentioned arm to revolve underneath. I obtain these objects by the mechanism illustrated in the accompanying drawings, in which—

Figure 1:
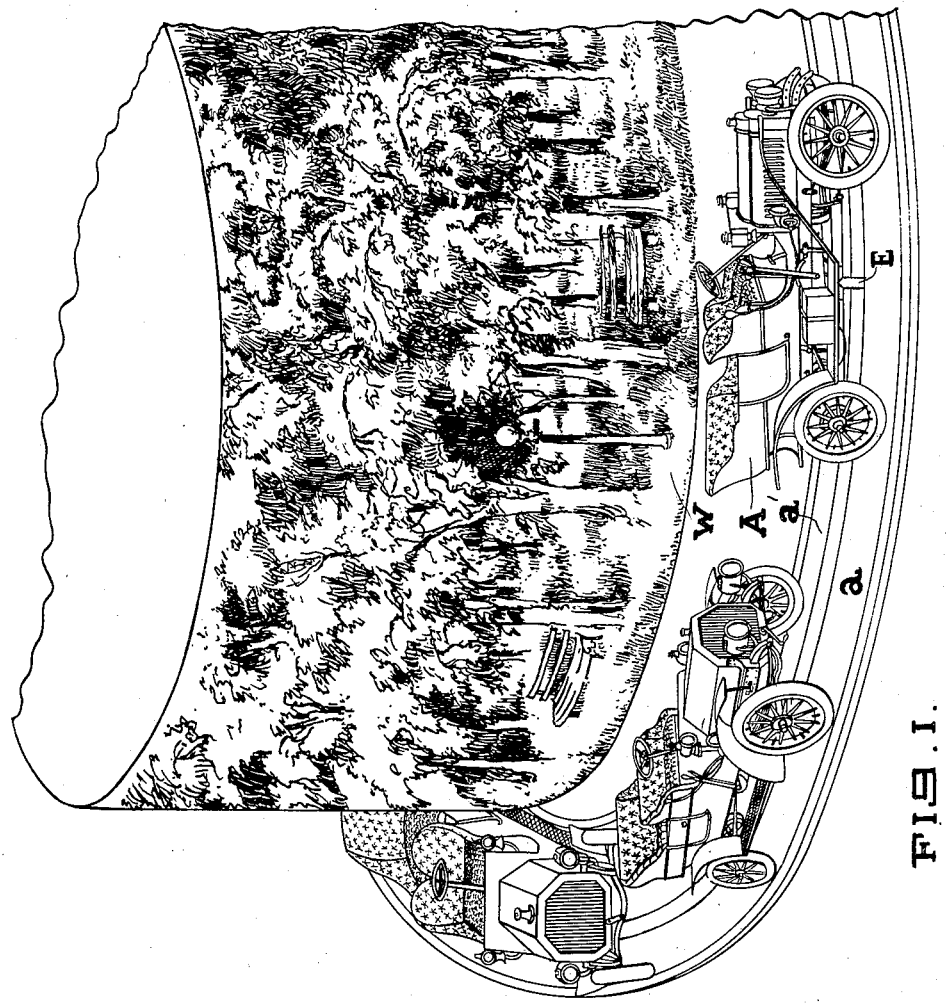
Figure 2:
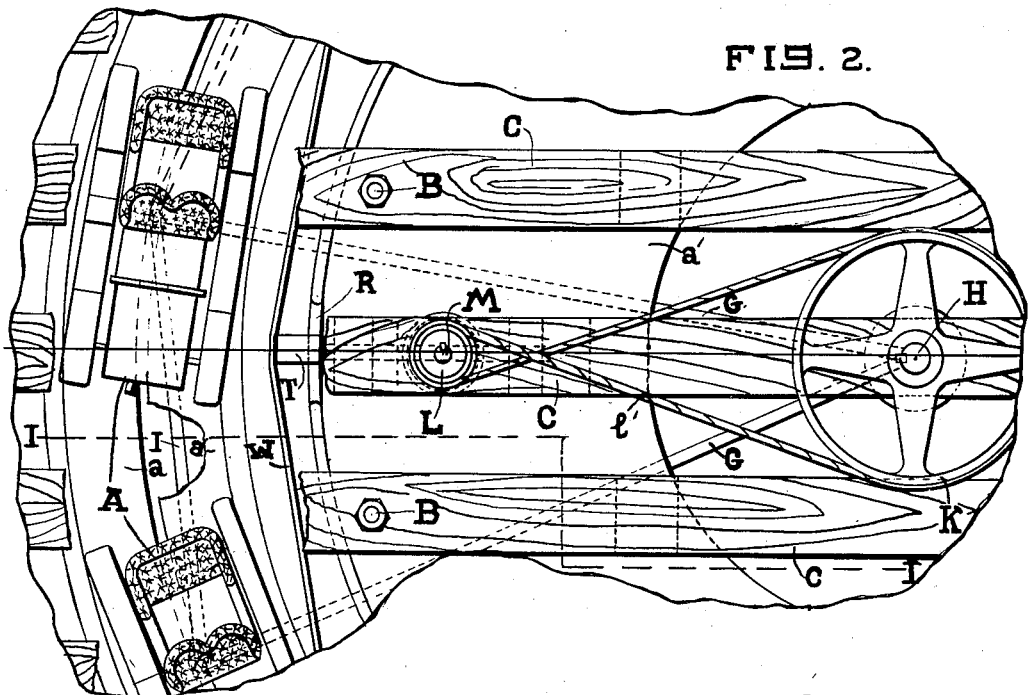
Figure 3:
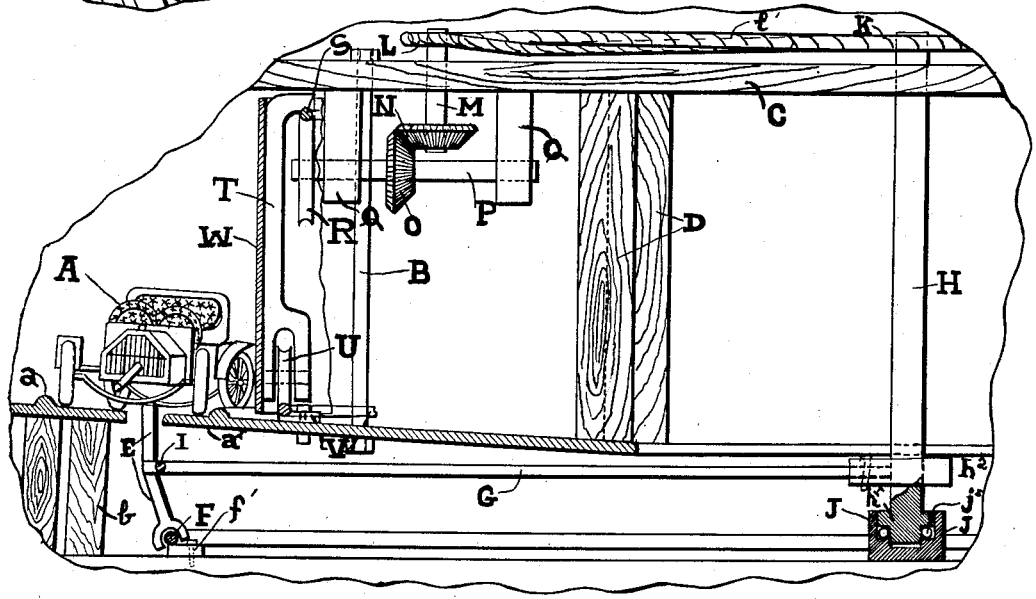

Figure 1, is a portion of the perspective view of the entire machine. Fig. 2, is a portion of the plan of the machine. Fig. 3, is a vertical section of a part of the machine on the line I I, of Fig. 2. Fig. 4, is the guide-rod showing how it is connected to the frame of the automobile. Fig. 5, is a portion of the connecting rod, showing how it is attached to the guide-rod. Fig. 6, is a portion of the center shaft with the hub attached, with shaft resting in its ball-bearing base. Fig. 7, is a view of the scene guide pulley.

Similar letters refer to similar parts throughout the several views.

The automobile A, of which there are several placed at intervals in the machine, is a special or ordinary car. The forward wheels of each automobile are fastened at the proper angle to make them follow in their proper course. One or more of these automobiles are to furnish the power necessary to operate the machine. This power may be steam, gasolene, or electric; in the latter case the electric current may be furnished by a number of storage cells carried in the one or more automobiles, or the current may be generated outside and furnished to the one or more automobiles by means of wires. These automobiles travel over the stationary, slanting, circular, continuous, divided, floors $a$ $a^1$ which are separated from each other by a continuous, radial opening or slot which is wide enough to allow the guide-rods E to pass between the said floors $a$ $a^1$ without touching.

The floor $a$ is supported by timbers from the foundation of the machine. The floor $a^1$ is suspended from the upper floor C by means of metal rods B, of which there are many placed at regular intervals in the machine. The inner edge of the said floor $a^1$ is braced by wooden beams or timbers D from the upper floor C. The reason for thus suspending the floor $a^1$ is, that the spokes or arms G revolves underneath the said floor $a^1$ making it impossible to brace it from beneath.

The floors $a$ $a^1$ slant slightly downward towards the center of the machine in order to help overcome the centrifugal force of the automobiles.

Attached to the frame work of the automobile (see Fig. 4) are the rods X which joins the two axles of the automobile. Fastened to these rods is the metal bar $X^2$. Into this is set the upper end of the guide-rod E. Rods $x$ are used to brace the guide-rod E from the rods X. Thus the guide-rods E, of which there is one for each automobile, are made secure and firm to their respective automobiles and extending downward perpendicularly through the aforesaid radial, continuous slot or opening between the floors $a$ $a^1$ to the point where the spoke or arm G is made fast to it. From this point (see Figs. 2 and 3) the guide-rod E slants slightly inward toward the center of the machine. The lower end of the guide-rod E, spans, but does not touch the metal guide-track F which is fastened by means of the holders $f^1$ to the foundation of the machine in a continuous, circular form. The use of the guide-track F is to prevent the automobiles from traveling out of their proper course, as in case of accident.

Connecting the guide-rods E of the adjacent automobiles is the rod I (see Fig. 5) which is provided with a turn buckle $I^1$ (see Fig. 4) in order to adjust the distances between the adjacent automobiles, thus connecting all the automobiles one to the other in a continuous string. The uses of these rods I are to enable the automobile, or automobiles, as the case may be, provided with means of self propulsion, to push or draw those automobiles not being provided with means of self propulsion.

The spokes or arms G, one of which are connected to each and every guide-rod E, revolve underneath the said floor $a^1$. The center or hub for these arms G (see Fig. 6) is the hub $h^2$ which is made fast to the shaft H. The uses of the arms G are,—first; to help keep automobiles in their proper course, and second; to equalize the pull between the automobiles, and third; to operate the center shaft H which is indirectly to operate the moving scene, which will be described later.

At the lower end of the shaft H is a ball bearing cone $h^1$ which rests on the ball bearings $j^1$ contained in the ball bearing case J. (See Fig. 6). The shaft H has a bearing in the upper floor C and through which it extends having the pulley $k$ fastened to it above the upper floor C. The smaller pulley L is connected by a crossed belt or cable $l^1$. Thus the pulley L revolves in an opposite direction to the traveling of the automobiles.

In the center of the pulley L is fixed the shaft M, which extending through its bearing in the upper floor C terminates in the beveled gear U. The beveled gear O, with the shaft P securely fixed in its center, meshes into the beveled gear N. Thus the shaft P, revolving in the bearings Q, turns in the reversed direction to the pulley L and in the same direction as the pulley K, which latter revolves in the same direction as the automobiles. It follows that the shaft P revolves in the opposite direction to the wheels of the automobiles. Consequently when the concave pulley R comes into contact with the circular, continuous, track S, it pushes it in the opposite direction to the traveling automobiles. The pulley R, which is fastened to the shaft P, is leather or rubber covered to prevent its being noisy while running upon the track S.

To the circular, continuous, track S are fastened at intervals the scene-holders T. The lower end of I is provided (see Fig. 7) with a leather or rubber covered pulley U which is free to turn upon its bearing $U^2$. The leather or rubber covering $U^1$ is fastened to its concave surface to prevent noise. The pulley U runs over, but does not touch the track V, except in case of an accident, when the scene might fall. The real weight of the scene and its necessary attachments bears upon the pulley R. The track V provided for the pulley U to run upon it when necessary, is continuous, circular and fastened at intervals on the floor $a^1$ by means of the holders $v^1$.

W represents the scene which is fastened to the scene-holder T, the scene W may be of any convenient scene painted to represent woods, country or park scenes, etc., and travels inside of automobile course and outside of all metal rods, or bolts; also timbers used to hold up and brace inner floor $a^1$.

The object of having the scene W travel in an opposite direction to the traveling automobiles is,—first; to furnish a variety of scenery to the riders in the automobiles and second; to make the riders in the automobiles think they are traveling faster than they really are traveling.

I claim:—

1. The combination in an automobile pleasure-giving machine, of a plurality of automobiles, one or more being provided with means of self propulsion, with a circular, continuous divided, slanting stationary floor, over which the automobiles travel, as set forth.

2. The combination in an automobile pleasure-giving machine, of automobiles adapted to propel themselves on a divided, slanting, stationary floor, whose outer divisional edge is supported from beneath and whose inner divisional edge is suspended from above, all substantially as set forth.

3. The combination in an automobile pleasure-giving machine, of divided, slanting, stationary floors with automobiles adapted to travel over them, and with a single guide rod made fast to the automobile, which extends between the divided floors to the circular, stationary guide track beneath as set forth.

4. The combination in an automobile pleasure-giving machine, of automobiles provided with guide-rods which extend downward vertically to a point beneath the floor then slanting slightly inward, with circular, continuous, stationary guide-track being engaged by the lower end of guide-rods, all substantially as set forth.

5. The combination in an automobile pleasure-giving machine, of automobiles provided with guide-rods which extend downward vertically to a point beneath the floor, with connecting-rods joining the adjacent guide-rods and thus forming one continuous string beneath the floor, as has been shown.

6. The combination in an automobile pleasure-giving machine, of automobiles provided with guide-rods, a center shaft with spokes joining the guide-rods and a hub on the center shaft, with a ball-bearing center shaft base, all substantially as shown.

7. The combination in an automobile pleasure-giving machine, of automobiles containing power within themselves connected by guide-rods and connecting rods to a center shaft, with pulley driving another pulley, with beveled gears and concaved pulley made to revolve in the same direction as the traveling automobiles, as set forth.

8. The combination in an automobile pleasure-giving machine, of automobiles adapted to propel themselves upon a stationary floor and by means of a spoke or arm making a center shaft revolve to furnish the power to operate the scenery, substantially as set forth.

9. The combination in an automobile pleasure-giving machine, of self-propelled automobiles adapted to travel over a stationary floor, upon which the circular, continuous scene is adapted to revolve in an opposite direction to the traveling automobiles, the power being furnished by the automobiles, all substantially as set forth.

10. The combination in a pleasure-giving machine, of a plurality of carriages, a circular, continuous, slanting, stationary floor over which said carriages are adapted to travel, a central upright shaft, arms, each arm connecting one of said carriages to said shaft, and means of rotating said shaft.

11. The combination in a pleasure-giving machine, of a series of passenger conveyances, means for driving said conveyances in a circle, a circular scene arranged within said circle and means of rotating said scene in the opposite direction to that in which said carriages are driven.

LEON W. WHIPPLE.

Witnesses:
CLARENCE E. LESUER,
GRACE CROWLEY.